June 27, 1950 M. L. ALEXANDER 2,512,595

SELECTIVE DETECTOR CIRCUIT

Filed March 27, 1947

INVENTOR
MAURICE L. ALEXANDER
BY [signature]
ATTORNEY

Patented June 27, 1950

2,512,595

UNITED STATES PATENT OFFICE 2,512,595

SELECTIVE DETECTOR CIRCUIT

Maurice L. Alexander, Fort Wayne, Ind., assignor, by mesne assignments, to Farnsworth Research Corporation, a corporation of Indiana Application March 27, 1947, Serial No. 737,453

3 Claims. (Cl. 250—20)

Figure 1:
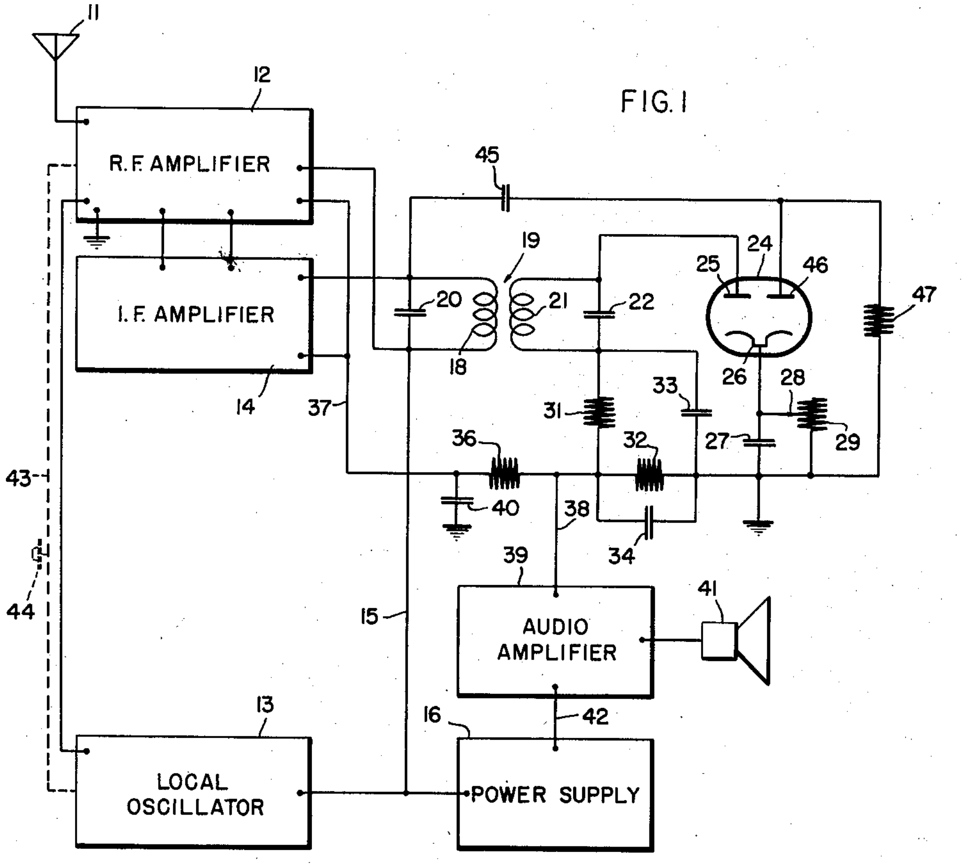

This invention relates in general to radio receivers and more particularly to a detector circuit adapted to adjustably control the effective selectivity response of a receiver.

The present day radio receivers are provided with tuning circuits having a relatively broad selectivity response to thereby permit reception and reproduction of a substantially wide band of audio frequencies. The selectivity response curve of such receivers is a sloped curve having an extremely wide skirt as compared to the peak of the curve. The wider the skirt of the response curve, the less selective is the receiver and the more broadly it tunes. Understandably, the shape of this response curve is determined by the radio frequency transformer design, the number of transformers employed, and the degree of coupling practiced in the radio frequency stages which precede the detector. It is well known that a receiver having a broad characteristic response is subject to noise and side band interference due to its inherent lack of selectivity.

Many methods have been advanced for sharpening the receiver response. However, it is well known that the sharpening of the characteristic response, as exemplified by the narrowing of the response curve skirt, usually also results in the simultaneous sharpening of the peak of the curve. Thus the tuning of the receiver becomes extremely sharp and critical, thereby requiring a visual tuning indicator for tuning. At the same time, due to the narrowing of its band-pass characteristics, such a receiver is incapable of satisfactory reception and reproduction of the relatively nominal band width of frequencies covered by a carrier signal which may contain modulative components such as produced by musical instruments.

The prior art radio receiver expressly adapted for selective operation represents a relatively expensive investment and such a receiver is usually not easily converted to broad band-pass characteristics without necessitating a plurality of circuits and controls for such purpose. It is to be further noted, that in a prior art type of receiver there is a noticeable difference, in tuning dial band width coverage, between signals received from local or long distance stations.

Obviously in inexpensive radio receiver having an apparent characteristic response, the curve of which would not slope out into a wide skirt, but which would assume the form of a substantially straight-sided skirt, would be desirable by reason of being more selective, thus eliminating the aforementioned side band interference. Yet at the same time, the required, or fairly broad, frequency response of the receiver should not be detrimentally affected provided that the response curve peak is not sharpened. Additional efficiency may be further secured by adjustably controlling the frequency width of this straight-sided response to the requisite degree for selectivity purposes or for adequate audio frequency coverage. A further advantage would be realized by arranging for the insertion, removal, or variation, of the selectivity controlling circuit by the manipulation of but a single control.

It is the purpose of this invention to remedy the aforementioned deficiencies of the prior art receivers and, at the same time, to accomplish this purpose by the novel use of but a few inexpensive receiver components.

Therefore, it is an object of the present invention to provide a selective detector circuit adapted to provide a characteristic overall response having substantially straight sides.

Another object of the present invention is to provide a receiver of substantially quieter operation, whereby the effective narrowing of the characteristic response eliminates side band noises and other interferences attendant to broad frequency response.

Still another object of the present invention is to provide a receiver which is relatively easy to tune to exact resonance without necessitating a visual tuning indicator.

A further object of the present invention is to provide a detector circuit wherein the overall characteristic response may be manually varied by a single control to a predetermined degree while still maintaining a straight sided characteristic response.

Yet another object of the present invention is to provide a selective receiver wherein the reception of a local or long distance station will be more nearly alike in band width coverage on the tuning dial, and more nearly alike in volume level.

Still another object of the present invention is to provide a normally broad band-pass receiver with a relatively selective and narrow band-pass detector circuit which may be instantly rendered inoperative whereupon the receiver will immediately be restored to its normal response characteristic.

In accordance with this invention, in general, there is provided a source of an intermediate frequency wave which is modulated by an intelligence signal. Also, there is provided a first resonant circuit which is coupled to the intermediate frequency wave source and which is broadly tuned to the intermediate frequency. A second resonant circuit is coupled to the first resonant circuit and is narrowly tuned to the intermediate frequency. Additionally, there is provided means coupled to the second resonant circuit for demodulating the intermediate frequency wave voltage which is developed in the second resonant circuit. Another means coupled to the first resonant circuit functions to demodulate the intermediate frequency wave voltage developed in the first resonant circuit. There, furthermore, is provided means coupling the two demodulating means which functions to bias to an inoperative state whichever one of said two demodulating means has impressed thereon the voltage of lesser magnitude.

In accordance with a particular embodiment of this invention there is provided a radio receiver arranged with conventional tuning facilities and having a first rectifier circuit and a second rectifier circuit. These rectifier circuits are provided with a signal input transformer having a pair of windings each of which is tuned to resonance at the same frequency. A first winding is connected to a source of signals and has a relatively broad frequency response characteristic. This winding is also coupled to said first rectifier whereby a rectified signal voltage will be effected which shall be hereinafter classified as a bucking voltage. A second winding is coupled to the first winding and has a relatively narrow frequency response characteristic. This winding is coupled to said second rectifier which normally functions as a detector stage to provide audio signal voltages and automatic volume control voltage.

Both rectifying circuits are arranged with a common cathode circuit whereby the aforementioned bucking voltage may be applied to this cathode to exercise a controlling effect over the normal signal detector circuit. There is also provided in this cathode circuit a cathode resistor, of variable type, whereby control may be exercised over the magnitude of bucking voltage which may be developed at and impressed upon the cathode. The bucking voltage may thereupon be applied to the detector signal voltage and thereby effectively influencing the detector stage to apparently maintain a relatively narrow frequency response characteristic regardless of the amplitude of the applied input signals.

For a better understanding of the invention, together with other and further objects thereof, reference is made to the following description, taken in connection with the accompanying drawing and its scope will be pointed out in the appended claims.

Figure 2:
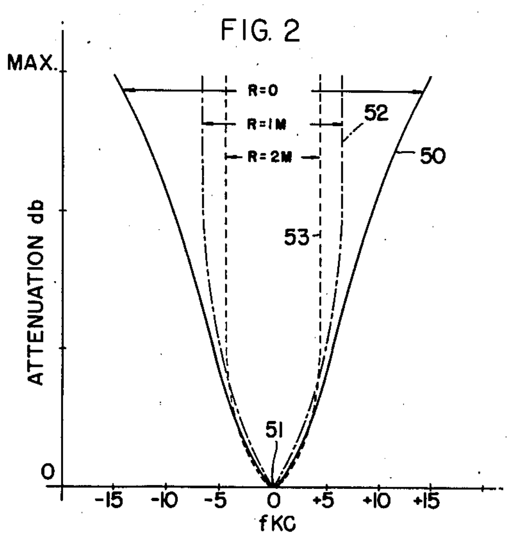
Figure 3:
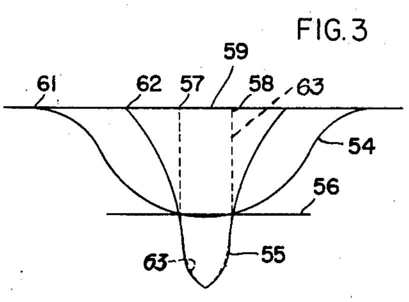

In the accompanying drawing:

Fig. 1 is a partly schematic block diagram of a radio receiver provided with the variably selective detector circuit embodying the present invention; and Fig. 2 and Fig. 3 illustrate the response curves of the receiver showing the normal characteristic response, in comparison with the straight-sided selective response obtained with the present invention.

Referring now to Fig. 1 of the drawing, there is shown a superheterodyne type of receiver which in most respects is conventional. Carrier signal energy is collected by an antenna 11 and is impressed upon a radio frequency amplifier 12. There is also coupled to this amplifier a local oscillator 13 whereby the amplifier may function also as a frequency converter stage. The output of radio frequency amplifier 12 is coupled to the input of an intermediate frequency amplifier 14. Space current for the radio frequency amplifier, the intermediate frequency amplifier, and the local oscillator is provided by a connection to the high voltage conductor 15 which is terminated at a power supply 16. The output of the intermediate frequency amplifier 14 is coupled to the primary winding 18 of an intermediate frequency transformer 19. The primary transformer winding is tuned to the intermediate frequency by a shunt-connected condenser 20 in such a manner that it normally has a relatively broad frequency response characteristic. The intermediate frequency transformer 19 also is provided with a secondary winding 21 which is inductively coupled to the primary winding 18 and is shunted by a condenser 22 by means of which the winding 21 is tuned to be responsive to the intermediate frequency in a manner whereby its frequency response characteristic is relatively narrow as compared to that of primary winding 18.

There is coupled to the secondary winding 21 a signal rectifying or detection circuit. This circuit includes the left hand portion of a duo-diode 24, the anode 25 of which is connected to the upper terminal of the winding 21, and the cathode 26 of which is connected to a cathode condenser 27 and also to the movable arm 28 of a variable resistor 29 which has one end thereof connected to ground. The lower terminal of the secondary winding 21 is connected through a series arrangement of resistors 31 and 32 to ground. Condensers 33 and 34 are connected from the respective terminals of the resistor 31 to ground and serve to filter the intermediate carrier frequency component from the audio circuit. A resistor 36 is connected at the junction point between resistors 31 and 32 and is coupled by means of a conductor 37 to the radio frequency amplifier 12 and to the intermediate frequency amplifier 14 to effect automatic volume control in the usual manner. A condenser 40 is conventionally coupled between conductor 37 and ground for filtering and removal of audio frequency components from the automatic volume control circuit. A conductor 38 also is connected to the junction point between resistors 31 and 32 for applying an audio signal input voltage to an audio amplifier 39. The output of the audio amplifier 39 is coupled to a loud speaker 41 for the audible reproduction of the audio signals. Space current for the audio amplifier stage 39 is provided by a conductor 42 which connects with the power supply 16.

The radio frequency amplifier 12 may be tuned, and the frequency of the local oscillator 13 may be varied simultaneously therewith, in a conventional manner, by mechanically coupling the respective tuning elements by a linkage 43. These tuning elements may be controlled manually by means of a tuning dial 44 connected to the linkage.

A bucking voltage rectifier circuit is derived from the primary winding 18 of the intermediate frequency transformer 19. This winding is coupled by a condenser 45 to the right hand anode 46 of the duo-diode 24. This rectifier circuit also includes a resistor 47 which is connected between the anode 45 and ground. It will be noted that the primary rectifier circuit and the secondary rectifier circuit employ a common cathode circuit.

Referring now to the normal operation of the receiver and its detector stage, assume that the cathode resistor 29 is adjusted to a value of zero resistance whereby the cathode 26 of the diode 24 is placed at ground potential. Carrier signal energy which is collected by the antenna 11 is conducted to the input of the radio frequency amplifier 12. The manipulation of the tuning dial 44 will cause the linkage 43 to simultaneously move the tuning elements associated with the amplifier 12 and the oscillator 13. When resonance with a carrier signal is reached, the amplifier 12, functioning as a converter stage, causes generation of an intermediate frequency. The intermediate frequency output signals from the amplifier 12 are applied to the primary circuit of transformer 19 comprising winding 18 and condenser 20 which is inductively coupled to the secondary circuit consisting of winding 21 and condenser 22. A rectifying circuit comprising the anode 25 and the cathode 26 and the resistors 31 and 32 is arranged across the secondary circuit to provide a series rectification circuit for the applied input signals. The rectified voltage developed across resistor 32 is impressed upon the audio amplifier 39, by means of conductor 38. This rectified voltage, or detected signal is then amplified and applied to the loud speaker 41 for reproduction. At the same time a portion of the rectified signal voltage developed across resistor 32 also is applied to the described automatic voltage control network for conventional automatic volume control of the amplifiers 12 and 14.

The receiver circuit shown and described herein is purely illustrative and is not to be considered a limitation. The method of increasing the selectivity of this detector circuit as will be presently described is equally applicable to other receiver arrangements such as tuned radio frequency receivers, or the like.

It will be noted that during the described operation of the receiver, the cathode resistor 29 has been maintained at a zero value of resistance, and that the operation of the detector stage is conventional. Assume now that, under these conditions, a curve is plotted with respect to the selectivity of this receiver. Reference is now made to Fig. 2 of the drawing wherein curve 50 may be considered representative of the overall selectivity achieved by the conventional operation of the receiver described. The curve 50 shows the signal amplitude with respect to resonance, whereby a minimum degree of signal attenuation exists at the resonance point 51, and there is a gradual sloping off to maximum attenuation on both sides of the resonance point. It is apparent that, as curve 50 deviates from the center frequency or resonance point, the receiver sensitivity falls off while the band-pass coverage increases. This is normal behavior in a prior art receiver and represents the problem to which the present invention is directed. It is also pointed out that, with respect to the curve 50, the legend shown thereon R=0 indicates that this characteristic response curve is applicable to the receiver during the time that the cathode resistor 29 (R) is adjusted to a value of zero (0) resistance.

Before describing in detail the application of the bucking voltage to the detector stage it will be understood that the use of the term "voltage developed" applies to voltage produced by a current flow through an impedance device, such as a resistor, whereas the term "voltage impressed" does not necessarily require such a current flow.

Reference is now made to the rectifying circuits shown in Fig. 1 wherein, as previously described, the secondary circuit and its associated left hand portion of diode 24 provides rectification for signal intelligence purposes and may be classified as a series diode detector. The primary circuit which is coupled to the right hand portion of diode 24 generally conforms to a short circuit or shunt detector and is employed, in this instance, to generate a bucking voltage at the cathode 26 of diode 24. The primary circuit applies a radio frequency voltage across its rectifier circuit whereby the rectified voltage is proportional to the applied radio frequency voltage. Similarly, the secondary rectifier circuit is arranged so that its rectified voltage is proportional to the radio frequency voltage applied across the secondary circuit. Cathode 26 is common to both the primary and secondary circuits. Therefore, the "bucking voltage" will exert a controlling influence over the rectification action of the detector stage, whereby the effective characteristic response of the detector may be governed. This action is accomplished in a common circuit whereby the detector cathode, operating at a positive potential, is effectively biased towards non-conduction by superimposing thereon a positive bucking potential which at times is of greater magnitude than the positive cathode potential produced by signal detection.

For the purpose of generating the bucking voltage the cathode resistor 29 may now be adjusted to some value such as one megohm. The cathode 26 and the series resistor 29 are now common to the primary and secondary rectifying circuits through the anodes 46 and 25 respectively. This provides an arrangement whereby, if the rectified primary, or bucking, voltage developed across resistor 29, is of greater magnitude than the peak of the radio frequency wave as applied by the secondary to its rectifier circuit, there will be no secondary circuit signal rectification. Conversely, if the rectified secondary voltage developed across resistor 29 is higher than the peak of the radio frequency wave applied by the primary circuit to its associated rectifier circuit, there will be no rectification of primary circuit energy. This controlled rectification action of the diode 24 and its associated circuits may be best described as a "teeter-totter" effect, whereby the predominance in magnitude of either the primary or the secondary voltage over the other causes the predominant voltage, by a blocking action, to assume control over the circuit having the voltage of lesser magnitude. The actual control position achieved is dependent upon the relationship of the incoming signal to the center frequency of the transformer 19. The resistance ratio existing between resistors 29 and 47 determines the magnitude of the bucking voltage which is applied to the secondary circuit.

In resonant circuits it is well known that the maximum response is produced when there is impressed upon the circuit energy having a frequency which is equal to or close to the resonant frequency of the circuit. When two such circuits are coupled together as in the case of the intermediate frequency transformer 19, both the primary and secondary voltages will be substantially at their respective maximum magnitudes at the resonant frequency of the transformer windings. In the case of the instant transformer which is designed to effect a voltage step-up between the primary and secondary windings, the magnitude of the secondary circuit voltage at resonance is greater than the primary voltage. Consequently, at resonance there is a voltage of greater magnitude impressed upon the left hand portion of the diode 24 than the voltage impressed upon the right hand portion of the diode. Furthermore, the magnitudes of the respective voltages produced in the primary and secondary windings decrease from maximum as the frequency of the energy impressed upon the primary winding deviates on either side of the resonant frequency. The decrease in the magnitudes of the two voltages is gradual, in the case of both circuits. However, since the primary winding 18 is more broadly tuned than the secondary winding 21, the rate of decrease of the secondary voltage is greater than the rate of decrease of the primary voltage. In the present invention, use is made of this difference in the performance of the primary and secondary circuits.

To understand the operation of this feature of the invention reference now will be made to Fig. 3 of the drawing. In this figure, the curve 54 represents the characteristic response of the primary winding 18 of the intermediate frequency transformer 19. Similiarly, the curve 55 is generally representative of the response characteristic of the secondary winding 21. It will be noted that, in view of the broader tuning of the primary winding, the curve 54 has a much broader skirt than the curve 55. Also, it will be noted that the maximum amplitude of the curve 55 is considerably greater than the maximum amplitude of the curve 54. It is seen, from an inspection of these curves, that there are critical frequencies at which the primary and secondary voltages are substantially equal. Two such frequencies exist because of the symmetrical shapes of the curves with respect to the resonant or center frequency. The line 56 indicates the two equal voltage points which occur at critical frequencies 57 and 58 approximately at the same deviation above and below the resonant frequency indicated by the point 59.

Consideration now will be given to the performance of the receiver when it is being tuned by moving upwardly through the frequency spectrum such as indicated by moving from left to right on the curves of Fig. 3. Until the frequency represented by the point 61 is reached it may be assumed that there is no response produced in either the primary or secondary circuits. As the receiver is tuned further toward the frequency indicated by the point 57, the primary circuit begins to respond as indicated by the curve 54. However, at the beginning of the primary response, there is no response effected by the secondary circuit, inasmuch as is assumed that the receiver has not been tuned to a frequency indicated by the point 62. The response voltage produced in the primary circuit is rectified in the right hand portion of the diode 24 to develop a control voltage in the cathode connected resistor 29. As the primary circuit voltage increases, the cathode 26 of the diode is increased in positive polarity which has the effect of biasing off both portions of the diode toward the region of nonconduction.

As the receiver tuning progresses to a frequency beyond that indicated by the point 62, the secondary circuit begins to respond to develop a voltage. This voltage, however, when applied to the left hand portion of the diode 24 is ineffective to produce conduction in this portion of the diode by reason of the fact that, at this time, there is sufficient rectification accomplished by the right hand portion of the diode to effectively bias off the left hand portion to a state of nonconduction. When the receiver is tuned to a critical frequency indicated by the point 57, the secondary circuit voltage and the primary circuit voltage are substantially equal. Up until the time just prior to reaching this point there is no signal rectification in the left hand portion of the diode 24 for the reason that the operation thereof is under the complete control of the rectified voltage derived from the primary circuit.

As the receiver tuning progresses to a frequency which is slightly closer to the resonant frequency than that indicated by the point 47, the secondary circuit voltage which, in this region of the response curve, is increasing at a relatively rapid rate exceeds in magnitude the primary circuit voltage which is increasing at a relatively slow rate. The rectified primary circuit voltage then is not capable of biasing the diode 24 by the production of a high enough positive potential at the cathode 26 thereof to prevent the left hand portion of the diode from functioning as a signal rectifier. Consequently, signal rectification in the secondary circuit begins quite abruptly and the magnitude of the rectified signal voltage is quite substantial, equal approximately to the voltage referred to at the critical frequency. The effect in the output circuit of the left hand portion of the diode 24 is the same as if the secondary response characteristic were represented by the broken line curve 63.

From this point on to resonance and further to the critical frequency 58 beyond resonance where the equal voltages for the primary and secondary circuits again is produced, it is the secondary circuit which controls the operation of the diode.

It is seen, therefore, that in the region of resonance, the cathode 26 will have developed thereat a much greater positive potential by reason of the operation of the left hand portion thereof than is capable of being developed by reason of the primary voltage impressed upon the right hand portion. Thus, it is seen that the right hand portion of the diode is rendered nonconducting when the receiver is tuned near to resonance. It should be particularly noted that the described functioning of the diode is accomplished by means of the connection of the resistor 29 into the cathode circuits of the two portions of the tube.

The variation of cathode resistor 29 to a particular value causes the resistance ratio between resistor 29 and resistor 47 to be likewise varied whereby a similar change is effected in the voltage distribution circuit across these two resistors. Thus the bucking voltage may be increased by increasing the value of resistor 29 whereby secondary circuit rectification will be limited between the critical frequency points which are determined by the magnitude of the bucking voltage.

By further increasing the value of resistor 29 the critical frequency points may be moved still closer to the center frequency thereby effectively narrowing, to a greater degree, the overall selectivity characteristic of the receiver apparatus. The extent of this narrowing effect may be had by again referring to Fig. 2 of the drawings wherein the curves 52 and 53 are indicative of different operating conditions in the detector circuit as caused by the application of bucking voltages of different magnitudes. With respect to curve 52 the cathode resistor value of one megohm was employed in the detector stage, whereas the curve 53 indicates a still further selective action resulting from the usage of a cathode resistor of 2 megohms.

It will be apparent from the curves shown in Fig. 2 that, with respect to detector response, the distance between the critical frequencies, as represented by the response skirts of curves 52 or 53 and the center frequency, decreases with the application of a higher value of cathode resistance. Curve 52 pertains to the detector response operating with a cathode resistor value of one megohm (R=1M) and is obviously responsive, at its widest point, to a frequency band width which is slightly greater than 5 kilocycles each side of center frequency. Curve 53 represents the receiver response achieved with a cathode resistor value of 2 megohms (R=2M), this curve shows that the overall receiver response has been considerably sharpened, whereby the band width at its widest point is substantially less than 5 kilocycles either side of center frequency. The normal characteristic response of the receiver, as illustrated by curve 51 (R=0) indicates a band width response, which is clearly in excess of the relatively narrow response achieved by the application of the bucking voltage to the detector circuit as indicated by the curves 52 and 53.

The apparent increase in selectivity gained herein provides for ease of tuning, inasmuch as the carrier signal will abruptly appear or disappear as the tuning elements pass through resonance. Side band interference and side band noises will also be eliminated by the selective characteristic gained herein, in comparison with a receiver having a broad characteristic response.

It is to be understood that the embodiment of this invention in a radio receiver does not alter or affect the actual frequency response of the various individual tuned circuits contained therein, but rather results only in the changing of the effective operating frequencies of the signal energy existent across resistor 32. In other words, by causing a current flow in the secondary rectifier circuit and changing it relative to frequency only during the period when the voltage, developed in the secondary tuned circuit exceeds that developed in the primary tuned circuit, a substantially selective tuning effect is established.

It will be noted, with respect to Fig. 2, that the selective skirt clipping action herein obtained does not substantially affect the nose of the characteristic response curves. Therefore, signal distortion is held to a minimum and further distortion possibilities are also eliminated due to the fact that, as resonance, the signal voltage developed across resistor 29 is determined almost entirely by the flow of current in the secondary circuit. Thus, a modulative component will not be apparent in the output rectified signal which normally would introduce, in a biased diode detector, a degree of signal distortion. If optimum ratios are also established between the resistors 32 and 47 there will be as low distortion, related to modulation percentage, as in any similar well designed conventional diode circuit. However, if the value chosen for resistor 29 were to be sufficiently high and beyond that value herein disclosed, the nose of the response curve would then be affected since the response curve skirt would be pulled in to such an extent, that a new response curve would be established having characteristics approaching that of the crystal filter stage of a communication receiver.

Referring to the tuned circuits which precede the selective detector circuit herein disclosed, overcoupling or critical coupling may be employed. Critical coupling between the primary and secondary circuits provides greater sensitivity, together with ease of alignment. The use of overcoupling will produce a characteristic response curve having a relatively broad nose. For broadcast reception purposes it is desirable that the response curve nose remain relatively broad while, at the same time, the response curve skirt width may be effectively narrowed. It is again pointed out that this result is relatively uncommon, inasmuch as in normal receiver circuit operation, the narrowing of the response curve skirt usually also results in the overall sharpening of the response curve nose.

It will also be apparent to those skilled in the art that the intermediate frequency transformer 19 and its associated source of signal energy may be replaced by other receiver apparatus of tuned radio frequency type. In all instances and variations such as untuned primary circuits, capacitively coupled circuits, or permeability tuned circuits, the applied signal energy will be rectified and selectively reproduced in accordance with the aforementioned description.

By means of the selective detector circuit embodied in the instant invention, a high fidelity receiver of relatively broad tuning characteristics, or a conventional home receiver of average frequency response characteristics, may be readily converted into a substantially selective receiving device, the degree of selectivity being variable, for the separation of stations that are closely aligned, or for eliminating noises and side band interference. The value of the present invention is further increased by consideration that the unusual results herein obtained are achieved by the novel application of a relatively few and inexpensive receiver components.

A further advantage is obtained by the use of but a single control to vary the receiver selectivity degree. This same control may be employed to render the selectivity function inoperative, whereby the receiver will revert to its normal broad response characteristics.

This selective detector circuit may be applied with good usage to communication type receivers whereby a high degree of apparent selectivity may be obtained in a single stage, in comparison with the plurality of stages, such as intermediate frequency amplifiers now required. The circuit herein disclosed thereby permits a substantial reduction to be made in the number of selectivity achieving components normally employed in a receiver. In contrast with the crystal filter devices normally employed in communication receivers a further improvement is noted by the use of this invention, in that voice modulated signal does not lose its intelligibility when received under the extremely selective conditions applied by this circuit and, at the same time, there is eliminated the necessity of signal phasing which is an absolute requirement for the operation of a crystal filter stage. It is to be further noted that a substantial saving would be effected by the aforementioned reduction in intermediate frequency amplifier stages and other components. The efficiency of this communication receiver may then be further increased by generally utilizing radio frequency amplifier stages to precede the converter stage, thus raising the overall gain of the receiver and, at the same time, effecting considerable increase in sensitivity and image suppression.

It will also be understood that the cathode resistor 29 may be replaced by a varistor, thereby securing a somewhat automatic selectivity characteristic, whereby the degree of selectivity would be determined by the magnitude of the input signals. The cathode resistor may also be replaced by a triode control circuit for the same automatically selective purpose, such as is accomplished by the varistor, or for remote selectivity control purposes whereby a biasing potential may be variably applied to the triode grid to overcome the intelligence signal rectifying circuit.

While the invention is applicable to a wide choice of component values which will establish the requisite circuit parameters, there follow specifications of a particular arrangement which provides satisfactory operating conditions.

| | |
|---|---|
| Condenser **27** ---------- | 100 micromicrofarads |
| Condenser **33** ---------- | 100 micromicrofarads |
| Condenser **34** ---------- | 100 micromicrofarads |
| Condenser **45** ---------- | 6.7 micromicrofarads |
| Resistor **29** ------------ | 3.2 megohms maximum |
| Resistor **31** ------------ | 47,000 ohms |
| Resistor **32** ------------ | 470,000 ohms |
| Resistor **47** ------------ | 470,000 ohms |
| Transformer **19** ------- | #1455-1 (I.F.) |
| Automatic Winding Co. . | Step up-aiding |

The duo-diode rectifier tube herein disclosed may be replaced by other arrangements such as two separate rectifier tubes having their cathode circuits connected in common.

While there has been described what, at present, is considered the preferred embodiment of the invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A radio signal detector comprising, a source of intelligence signals modulated on an intermediate frequency wave, a first resonant circuit coupled to said signal source and relatively broadly tuned to said intermediate frequency, a second resonant circuit inductively coupled to said first circuit and relatively narrowly tuned to said intermediate frequency, means coupled to said second circuit for detecting said intelligence signals, means coupled to said first circuit for developing a unidirectional voltage representative of the response by said first circuit to said intermediate frequency wave, and means including an impedance device coupled to said detecting means and to said unidirectional voltage developing means for biasing said detecting means to an inoperative state when the voltage developed in said first resonant circuit exceeds in magnitude the voltage developed in said second resonant circuit.

2. A radio signal detector comprising, two resonant circuits coupled together inductively and having impressed thereon a wave of predetermined frequency which is modulated in accordance with an intelligence signal, a first one of said resonant circuits being tuned to have a relatively broad frequency response characteristic with respect to said predetermined frequency and the second one of said resonant circuits being tuned to have a relatively narrow frequency response characteristic with respect to said predetermined frequency, a diode detector coupled to said second resonant circuit and including a resistor connected in circuit with the cathode of said diode, and means including a rectifier coupled to the first one of said resonant circuits and to said resistor for developing in said resistor a biasing voltage for said diode detector to maintain said detector in a nonconducting state while the voltage developed in said second resonant circuit is less in magnitude than the voltage developed in said first resonant circuit.

3. A radio signal detector comprising, a pair of diodes each having an anode and a cathode, a resistor connectible in common to both of said cathodes, an intermediate frequency transformer having primary and secondary windings, said primary winding being broadly tuned to an intermediate frequency and said secondary winding being narrowly tuned to said intermediate frequency, the turns ratio of said transformer windings being such as to effect a voltage step up between said primary and secondary windings, means for coupling said primary winding to a source of intermediate frequency wave, means for coupling said secondary winding to a first one of said diodes for effecting signal rectification in the output circuit of said first diode when it is in a conducting state, and means for coupling said primary winding to the second one of said diodes to develop a cathode biasing voltage in said resistor of a character to maintain said first diode in a non-conducting state until said secondary winding voltage is substantially equal to said primary winding voltage and to render said first diode conducting during times that said secondary winding voltage is of greater magnitude than said primary winding voltage.

MAURICE L. ALEXANDER.

REFERENCES CITED

The following references are of record in the file of this patent:

UNITED STATES PATENTS

| Number | Name | Date |
|---|---|---|
| 2,200,062 | Groeneveld ---------- | May 7, 1940 |